(12) United States Patent
Nitta

(10) Patent No.: US 8,342,201 B2
(45) Date of Patent: Jan. 1, 2013

(54) PRESSURE REDUCING VALVE

(75) Inventor: Toshinori Nitta, Saitama (JP)

(73) Assignee: Fujikura Rubber Ltd., Tokyo (JP)

( * ) Notice: Subject to any disclaimer, the term of this patent is extended or adjusted under 35 U.S.C. 154(b) by 722 days.

(21) Appl. No.: 12/479,977

(22) Filed: Jun. 8, 2009

(65) Prior Publication Data

US 2009/0302256 A1   Dec. 10, 2009

(30) Foreign Application Priority Data

Jun. 10, 2008   (JP) .................................. 2008-151769

(51) Int. Cl.
*F16K 31/12* (2006.01)
(52) U.S. Cl. ............................... 137/505.11; 137/505.29
(58) Field of Classification Search .................. 251/61.5, 251/331; 137/505.11, 505.29, 505.25
See application file for complete search history.

(56) References Cited

U.S. PATENT DOCUMENTS

| | | | | | |
|---|---|---|---|---|---|
| 1,595,809 | A | * | 8/1926 | Nichols | 137/116.5 |
| 2,313,564 | A | * | 3/1943 | Manly | 137/116.5 |
| 2,357,318 | A | * | 9/1944 | Donaldson | 137/505.11 |
| 2,879,783 | A | * | 3/1959 | Taplin | 137/116.5 |
| 3,545,471 | A | * | 12/1970 | Taplin | 137/505.18 |
| 3,926,204 | A | * | 12/1975 | Earl | 137/116.5 |
| 3,926,208 | A | * | 12/1975 | Hoffman | 137/505.18 |
| 4,177,830 | A | * | 12/1979 | Munson | 137/501 |
| 5,002,086 | A | * | 3/1991 | Linder et al. | 137/312 |
| 5,586,569 | A | * | 12/1996 | Hanning et al. | 137/505 |
| 6,554,017 | B2 | * | 4/2003 | Berger | 137/505.11 |

FOREIGN PATENT DOCUMENTS

| | | | |
|---|---|---|---|
| JP | 01314316 A | * | 12/1989 |
| JP | 05-113828 | | 5/1993 |
| JP | 05-257540 | | 10/1993 |
| JP | 11-119837 | | 4/1999 |
| JP | 2004-78292 A | | 3/2004 |

OTHER PUBLICATIONS

Official Action from corresponding Japanese Appln. No. 2008-151769 dated Aug. 21, 2012 (2 pages).

* cited by examiner

*Primary Examiner* — John K. Fristoe, Jr.
*Assistant Examiner* — Andrew J Rost
(74) *Attorney, Agent, or Firm* — McCormick, Paulding & Huber LLP

(57) ABSTRACT

A pressure reducing valve includes a opening/closing valve between primary and secondary pressure chambers, a diaphragm body, a valve hole through which the secondary pressure chamber is communicatively connected with the atmosphere, a relief valve which opens/closes the valve hole, and a linkage member which links the opening/closing valve with the relief valve so as to open/close in association with each other. The linkage member includes a valve guide having a valve passage through which the primary and secondary pressure chambers are communicatively connected, and a pintle inserted into a pintle hole and guided thereby. The opening/closing valve and the relief valve are provided on lower and upper ends of the pintle, respectively. The valve hole has a common axis with those of the valve passage and the pintle hole. One and the other of the valve guide and the pintle are made of resin and metal.

7 Claims, 3 Drawing Sheets

PRESSURE REDUCING VALVE

CROSS REFERENCE TO RELATED APPLICATION

The present invention is related to and claims priority of the following co-pending application, namely, Japanese Patent Application No. 2008-151769 filed on Jun. 10, 2008.

BACKGROUND OF THE INVENTION

1. Field of the Invention

The present invention relates to a pressure reducing valve and in particular to a pressure reducing valve with a grease-free (lubricant-free) guide mechanism for guiding an opening/closing valve.

2. Description of the Prior Art

In conventional pressure reducing valves, a guide mechanism is often used to improve the sealing performance in a main valve and in a relief valve (air release valve) thereof. Although conventional seal-packing-type pressure reducing valves are equipped with a guide mechanism for the relief valve, the resistance imposed on movements of the relief valve due to a seal packing is great because a guiding component of the guide mechanism needs to be equipped with a sealing mechanism. Conventional diaphragm-type pressure reducing valves are higher in sensitivity than seal-packing-type pressure reducing valves. In a diaphragm-type pressure reducing valve with no guide mechanism for the relief valve, the resistance caused upon actuation of the pressure reducing valve is small, however the relief valve becomes freely movable so that sealing repeatability is poor upon a return of the relief valve after it is opened, and accordingly, and hence the sealing performance is poor. In addition, the sealing performance deteriorates by a positional deviation of a diaphragm assembly upon installation thereof, which is a fairly common occurring problem.

A pressure reducing valve in which a valve shaft is formed as a separate element from a valve body so that a valve port can be securely sealed by the valve body even if the valve shaft tilts or is decentered is also known in the art (Japanese Unexamined Patent Publication Nos. H05-113828, H05-257540 and H11-119837

However, this conventional type pressure reducing valve needs to be lubricated with lubricating oil such as grease because a sliding portion, in which metals are in sliding contact with each other, exists in the guide mechanism of the valve body and also in the valve shaft. Therefore, in the case where the pressure reducing valve is used in an environment such as a clean room which does not tolerate impurities, the lubricating oil may get scattered.

SUMMARY OF THE INVENTION

In view of the above described conventional pressure reducing valve, the present invention provides a pressure reducing valve which does not require lubricant even though equipped with a guide mechanism for a valve body (a main valve and a relief valve), and which makes it possible to center the valve body itself.

According to an aspect of the invention, a pressure reducing valve is provided, including a opening/closing valve which opens and closes a passage between a primary pressure chamber and a secondary pressure chamber, a diaphragm body which is displaced in accordance with fluctuations in pressure in the secondary pressure chamber, a valve hole through which the secondary pressure chamber is communicatively connected with the atmosphere, a relief valve which opens and closes the valve hole, and a linkage member which links the opening/closing valve and the relief valve with each other so that the opening/closing valve and the relief valve perform valve opening/closing operations thereof in association with each other. The linkage member includes a valve guide which includes a valve passage through which the primary pressure chamber and the secondary pressure chamber are communicatively connected to each other, and a pintle hole; and a pintle which is inserted into the pintle hole of the valve guide through the valve passage and slidably guided by the pintle hole in an axial direction of the pintle. The opening/closing valve is provided on a lower end of the pintle. The relief valve is positioned at an upper end of the pintle. The valve hole has a common axis with the axes of the valve passage and the pintle hole. One and the other of the valve guide and the pintle are made of resin and metal, respectively.

It is desirable for the pressure reducing valve to include a relief valve casing installed in a central part of the diaphragm body, the valve hole being formed in an upper part of the relief valve casing. The relief valve casing includes a piston portion supported by a cylinder portion of the valve guide to be slidable thereon. A displacement of the diaphragm body causes the piston portion to move while sliding on the cylinder portion. One and the other of the valve guide and the relief valve casing are made of resin and metal, respectively.

It is desirable for the relief valve to be provided in the relief valve casing and for the valve hole to be formed in the relief valve, wherein a substantially conical surface, with which an upper end of the pintle comes in contact, is formed at an end of the valve hole, and the pintle is continuously biased by a biasing member in a direction to close the opening/closing valve and the relief valve.

A space between the cylinder portion of the valve guide and the piston portion of the relief valve casing can define a secondary-pressure releasing chamber, wherein a vent hole is formed through the piston portion of the relief valve casing. The valve hole is closed when a secondary pressure in the secondary pressure chamber is smaller than a set pressure. When the diaphragm body is displaced by a rise of the relief valve casing which is caused by an increase in the secondary pressure in the secondary pressure chamber beyond the set pressure, the vent hole is exposed from the cylinder portion of the valve guide so that the secondary pressure chamber and the secondary-pressure releasing chamber are communicatively connected with each other through the vent hole.

It is desirable for the valve hole, the valve passage, the pintle hole and the pintle to be coaxially arranged.

It is desirable for the biasing member to include a compression spring.

It is desirable for the pressure reducing valve to include a spring seat positioned on an opposite side of the relief valve casing from the relief valve side, wherein the spring seat is biased by a second biasing member in a direction to press the diaphragm body against the relief valve against the biasing force of the biasing member.

The second biasing member can be a compression spring.

According to the present invention, a reduction in number of elements of the pressure reducing valve is achieved since the opening/closing valve and the relief valve can be driven by a single pintle. In addition, since the vent hole is formed on an extension of a common axis of the valve passage and the pintle hole, the valve body itself can be easily centered, and the accuracy of sealing and sealing performance are improved.

BRIEF DESCRIPTION OF THE DRAWINGS

The present invention will be discussed below in detail with reference to the accompanying drawings, in which.

DESCRIPTION OF THE PREFERRED EMBODIMENT

Figure 1:
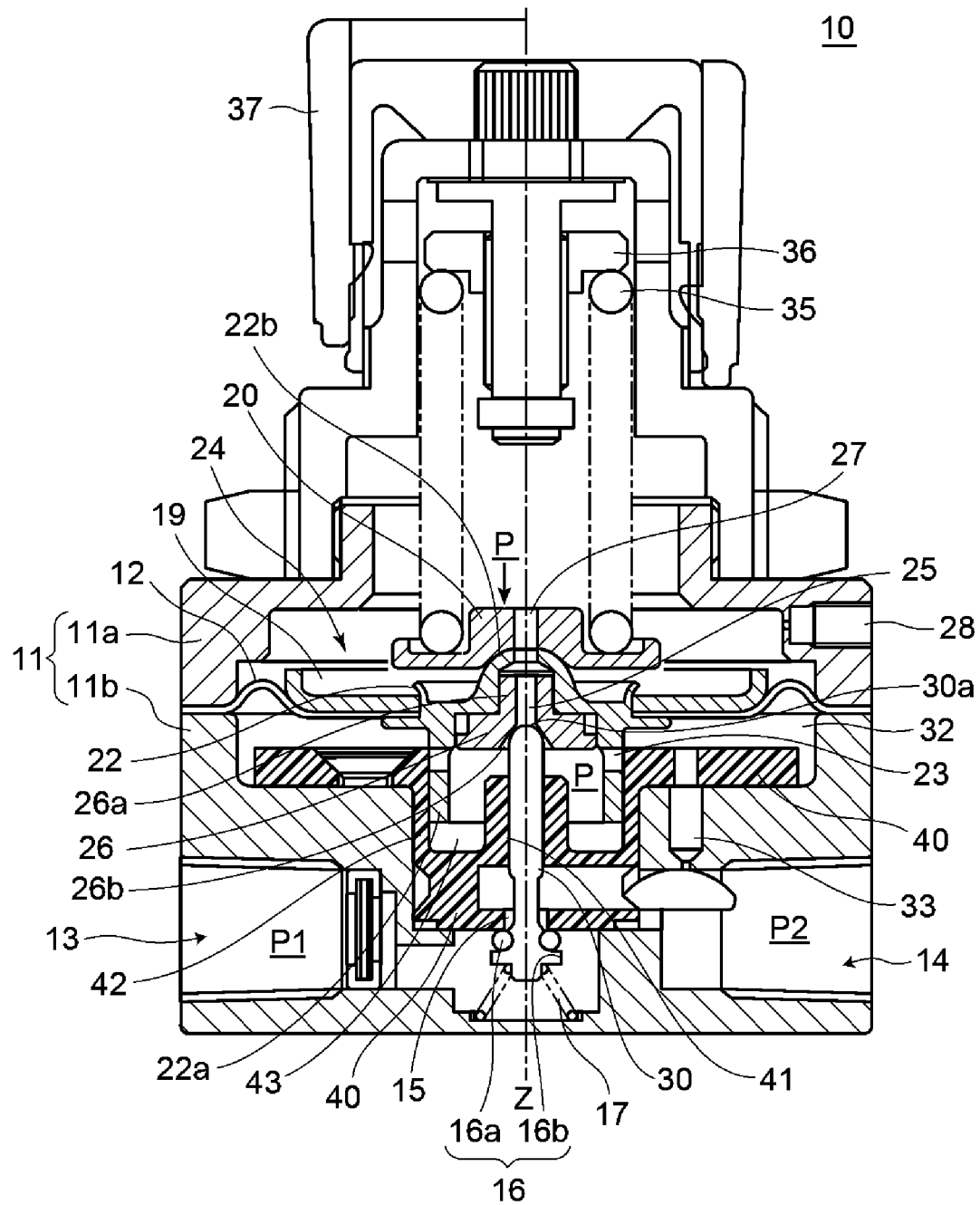
FIG. 1 is a longitudinal cross sectional view of an embodiment of a pressure reducing valve according to the present invention, showing an operating state thereof when a secondary pressure corresponds with a set pressure (within tolerance of the set pressure)

FIG. 1 is a longitudinal cross sectional view of an embodiment of a pressure reducing valve 10 according to the present invention. The pressure reducing valve 10 is provided with a housing 11 which is composed of an upper housing 11a and a lower housing 11b, and is further provided with a diaphragm 12, the outer edge of which is held between the upper and lower housings 11a and 11b.

The lower housing 11b is provided with a primary-pressure inlet port (primary pressure chamber) 13 and a secondary-pressure outlet port 14 which are open outwardly. The pressure reducing valve 10 is provided in the lower housing 11b with a valve guide 40, and the primary-pressure inlet port 13 and the secondary-pressure outlet port 14 are communicatively connected to each other through a valve passage 15 formed in the valve guide 40. The valve passage 15 is opened and closed by an opening/closing valve 16. The opening/closing valve 16 is continuously biased by a compression spring 17 in a valve closing direction (upward direction with respect to FIGS. 1 through 3). The opening/closing valve 16 is formed by a pintle 30, an O-ring 16a and a flange portion 16b. The pintle 30 passes through the valve passage 15 and is inserted into a pintle hole 41 formed in the valve guide 40 to be slidable therethrough in the axial direction of the pintle 30. The O-ring 16a is fitted on the flange portion 16b in the vicinity of the lower end thereof. The flange portion 16b is formed on the pintle 30 in at the lower end thereof to press the O-ring 16a against the valve passage 15. The pintle 30 is biased by the compression spring 17 in a direction to make the opening/closing valve 16 close the valve passage 15, and the O-ring 16a is brought into intimate contact with and is disengaged from the lower end of the valve passage 15 to close and open the valve passage 15, respectively. At least the valve guide 40 and the pintle 30 are made of resin and metal, respectively.

The pressure reducing valve 10 is provided on the upper housing 11a side of the diaphragm 12 with a piston plate 19 and a spring seat plate 20 which are stacked on the diaphragm 12 in that order. The piston plate 19 and the spring seat plate 20 are combined together by a relief valve casing 22 in a central part of the pressure reducing valve 10 to form a diaphragm body 24. A secondary pressure chamber 32 is formed between the diaphragm body 24, the valve guide 40 and the upper housing 11a.

The relief valve casing 22 is provided with a piston portion 22a and a dome portion 22b which closes an upper opening of the piston portion 22a. The dome portion 22b projects upward from a central opening of the piston plate 19 and is in intimate contact with a hemispherical recess (dome-shaped recess) which is formed underneath the spring seat plate 20 at the center thereof to be recessed upward. This spherical-surface engagement between the dome portion 22b and the spring seat plate 20 achieves (defines) a centering mechanism which can prevent an unbalanced load from occurring when the spring seat plate 20 is pressed by a compression spring 35 in order for the spring seat plate 20 to regulate the air pressure.

The pressure reducing valve 10 is provided at a center of the dome portion 22b and the spring seat plate 20 with a third vent hole 27 which passes through the dome portion 22b and the spring seat plate 20 to communicatively connect the internal space of the piston portion 22a and the upper housing 11a to each other. The third vent hole 27 is opened and closed by a relief valve 26 installed in the piston portion 22a of the relief valve casing 22. The internal space of the upper housing 11a that is communicatively connected with the internal space of the piston portion 22a via the third vent hole 27 is communicatively connected with the atmosphere through a fourth vent hole 28 formed in the upper housing 11a. The valve guide 40 and the pintle 30 constitute an linkage member via which the opening/closing valve 16 and the relief valve 26 perform valve opening/closing operations thereof in association with each other.

A second vent hole 25 and the third vent hole 27 share a common central axis with the valve passage 15 and the pintle hole 41. Namely the valve passage 15, the pintle hole 41, the second vent hole 25 and the third vent hole 27 define a cylindrical shape having a common central axis Z.

Figure 3:
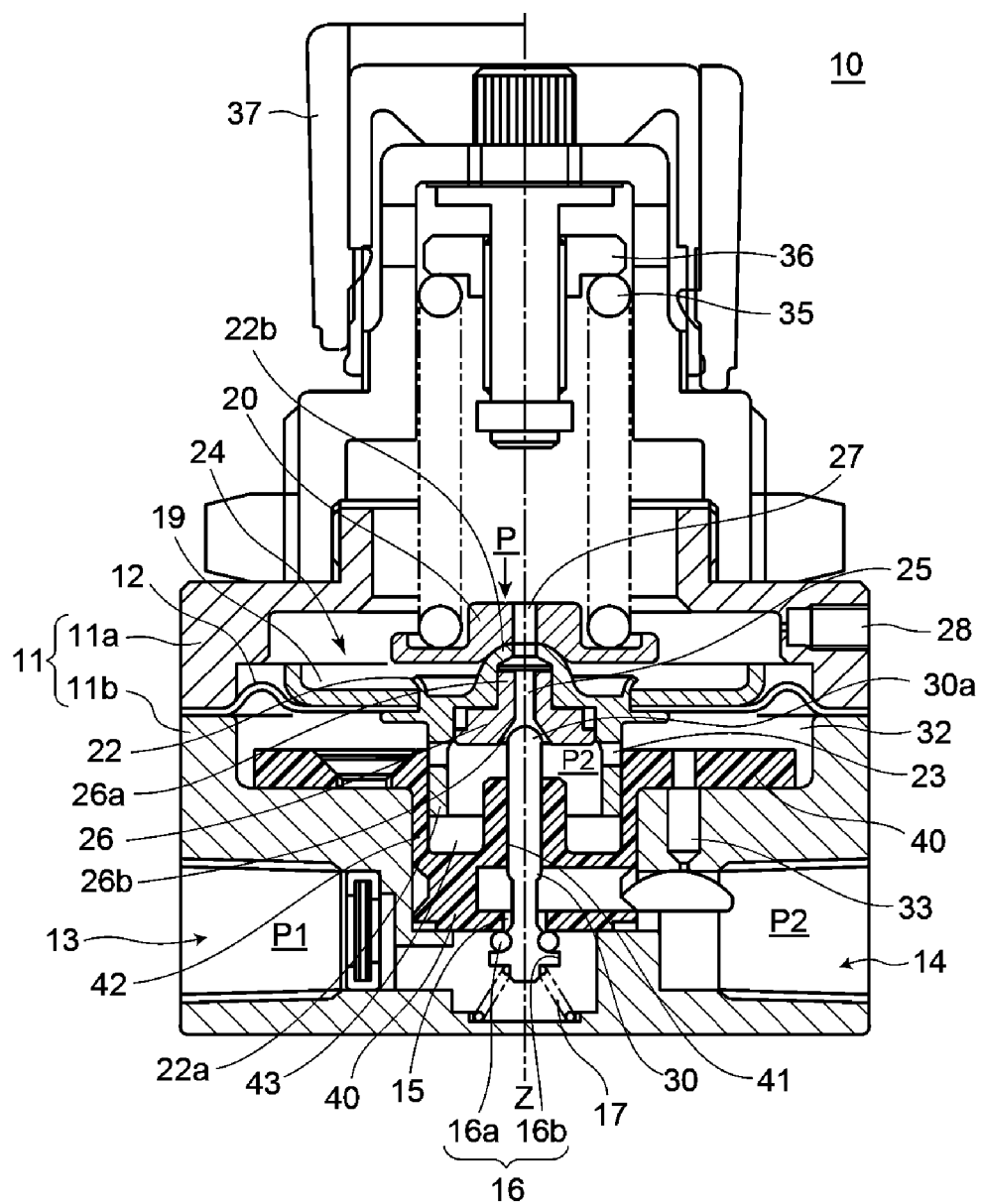
FIG. 3 is a view similar to that of FIG. 1, showing an operating state of the pressure reducing valve in the case where the secondary pressure rises above a set pressure (above tolerance of the set pressure).

The piston portion 22a of the relief valve casing 22 is inserted into a cylinder portion 42 formed on the valve guide 40 to be guided along the cylinder portion 42 to be slidable thereon. The space formed by the piston portion 22a, the cylinder portion 42 and the valve guide 40 defines a secondary-pressure releasing chamber 43. The piston portion 22a of the relief valve casing 22 is provided with a first vent hole 23 which is usually in a closed state in which the outer end of the first vent hole 23 is in intimate contact with the cylinder portion 42 (i.e., in a state where the secondary-pressure releasing chamber 43 is sealed airtight). However, the first vent hole 23 is formed so as to be exposed from the cylinder portion 42 upon a rise of the relief valve casing 22 to thereby make the secondary pressure chamber 32 and the secondary-pressure releasing chamber 43 communicatively connected to each other through the first vent hole 23 (as shown in FIG. 3).

Alternatively, the first vent hole 23 can be formed so that the secondary-pressure releasing chamber 43 and the secondary pressure chamber 32 are communicatively connected to each other through the first vent hole 23 at all times. In addition, instead of the first vent hole 23, a passage through which the secondary-pressure releasing chamber 43 and the secondary pressure chamber 32 are communicatively connected to each other can be formed in the valve guide 40.

The relief valve 26 is fitted in the piston portion 22a of the relief valve casing 22, and is provided on top center thereof with a boss 26a. The second vent hole 25 that is communicatively connected with the third vent hole 27 is formed through the center of the boss 26a of the relief valve 26. The inner edge of the lower end opening of the second vent hole 25 is chamfered to form a substantially conical surface 26b. The second vent hole 25 is closed by bringing an upper end portion 30a of the pintle 30 to be pressed against the conical surface 26b from below. With the second vent hole 25 being closed by the upper end portion 30a of the pintle 30, the pintle 30 biases the relief valve 26 in a direction to press the relief valve 26 against the third vent hole 27 so as to close the third vent hole 27, thus pressing the relief valve casing 22 against the spring seat plate 20 via the relief valve 26. Under normal conditions, the pintle 30, the second vent hole 25, the relief valve casing 22, the piston plate 19 and the spring seat plate 20 move together vertically with the upper end portion 30a of the pintle 30 closing the second vent hole 25, and thereby closing the third vent hole 27.

The pressure at the secondary-pressure outlet port 14 is applied to the secondary pressure chamber 32 via a communicating channel 33 which passes through the lower housing 11b and a flange of the valve guide 40.

The diaphragm body 24 is biased toward the lower housing 11b (downward with respect to FIGS. 1 through 3) by the compression spring 35. The compression spring 35 is held between the spring seat plate 20 of the diaphragm body 24 and another spring seat plate 36. The spring seat plate 36 is supported by a pressure adjusting screw 37 which is screwed onto the upper housing 11a. Accordingly, the biasing force of the compression spring 35 can be adjusted by turning the pressure adjusting screw 37. Namely, the biasing force of the compression spring 35 for biasing the diaphragm body 24, i.e., a secondary pressure P2 can be adjusted by adjusting the position of the pressure adjusting screw 37.

In the above described pressure reducing valve 10, at least the valve guide 40 is made of resin (synthetic resin), and at least the relief valve casing 22 and the pintle 30 which move while sliding on the valve guide 40 (except for shielding elements) are made of metal.

By making the pintle 30 and the relief valve casing 22 out of one of metal and resin and making the valve guide 40 (which is in sliding contact with the pintle 30 and the relief valve casing 22) out of the other of metal and resin, sliding friction and frictional resistance therebetween can be reduced. Moreover, lubricant such as grease does not have to be used because the sliding friction and frictional resistance are small, and there is no possibility of lubricant being scattered because no lubricant exists. It is desirable that a combination of the aforementioned resin and metal be a combination of a polyacetal resin and brass or stainless steel.

Operations of the pressure reducing valve 10 that has the above described structure will be discussed hereinafter.
($P \approx P2 < P1$)

In an initial state where a primary pressure P1 is applied to the primary-pressure inlet port 13 while the secondary pressure P2 at the secondary-pressure outlet port 14 corresponds with a set pressure P (within tolerance of the set pressure P), the upper end portion 30a of the pintle 30 is in intimate contact with the conical surface 26b at the lower end opening of the second vent hole 25 to seal the second vent hole 25, as shown in FIG. 1. Namely, in this initial state, in which the secondary pressure P2 is equal to the set pressure P (within tolerance of the set pressure P), the secondary pressure P2 at the secondary-pressure outlet port 14 is applied to the secondary pressure chamber 32 through the communicating channel 33, the diaphragm 12 pushes the piston plate 19 upward against the biasing force of the compression spring 35 to achieve the balance, the relief valve casing 22 and the relief valve 26 ascend with the piston plate 19, and the pintle 30 ascends so that the opening/closing valve 16 closes the valve passage 15.
($P > P2$)

Figure 2:
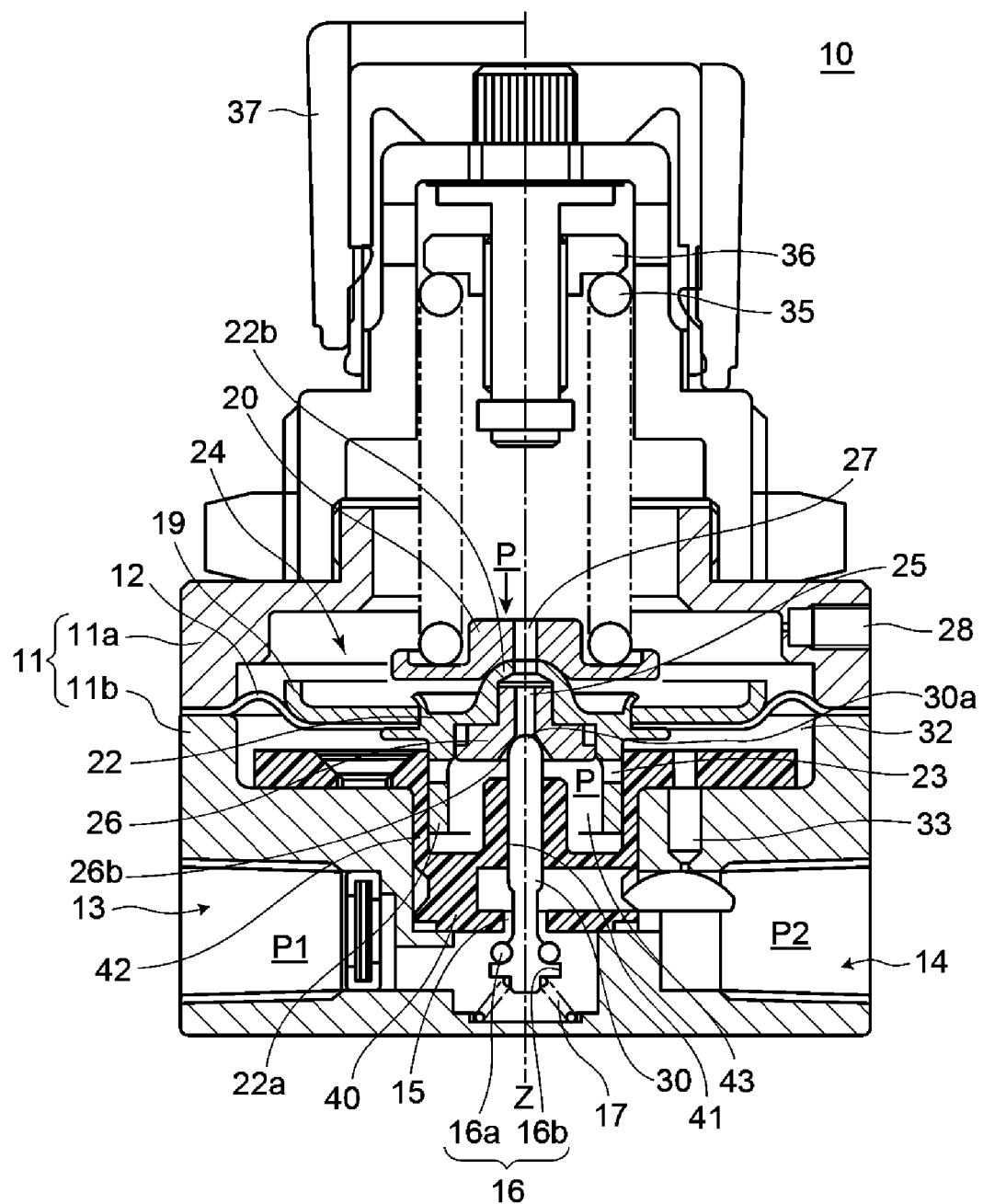
FIG. 2 is a view similar to that of FIG. 1, showing an operating state of the pressure reducing valve in the case where the secondary pressure drops below a set pressure (below tolerance of the set pressure)

Upon the secondary pressure P2 dropping below the set pressure P (below the set pressure P or tolerance thereof), the piston plate 19 is pushed downward by the biasing force of the compression spring 35, so that the diaphragm body 24 moves downward. As a result, the relief valve casing 22 pushes the pintle 30 downward, so that the opening/closing valve 16 is disengaged from the valve passage 15 to open the valve passage 15, as shown in FIG. 2. Consequently, the primary pressure P1 from the primary pressure inlet port 13 is applied to the secondary pressure outlet port 14 via the valve passage 15, so that the secondary pressure P2 increases, and the secondary pressure P2 in the secondary pressure chamber 32 which is communicatively connected with the secondary-pressure outlet port 14 via the communicating channel 33 also increases. This increase of the secondary pressure P2 acts as a force exerted on the piston plate 19 to raise the piston plate 19. In accordance with this increase of the secondary pressure P2, the piston plate 19 rises against the biasing force of the compression spring 35, and the piston plate 19 stops rising at a position where the balance between secondary pressure P2 and the biasing force of the compression spring 35 is achieved. When the piston plate 19 rises in this manner, the pintle 30 that is biased by the compression spring 17 also rises to thereby either narrow the flow channel between the opening/closing valve 16 and the valve passage 15 to reduce the flow rate of fluid at the primary pressure P1 that flows through the valve passage 15, or close the same flow channel to close the valve passage 15.

When the secondary pressure P2 is at the set pressure P (within tolerance thereof), the opening/closing valve 16 slightly opens and closes the valve passage 15 repeatedly in normal conditions.

Namely, upon the secondary pressure P2 exceeding the set pressure P (beyond the tolerance thereof), the relief valve casing 22 rises against the biasing force of the compression spring 35 while the pintle 30 rises until the opening/closing valve 16 closes the valve passage 15 to stop supplying the primary pressure P1, so that the secondary pressure P2 stops rising.

Conversely, if the secondary pressure P2 drops, the relief valve casing 22 is pushed downward by the biasing force of the compression spring 35, which causes the pintle 30 to move down. Subsequently, upon the pintle 30 moving down until the opening/closing valve 16 opens the valve passage 15, the primary pressure P1 is supplied to the secondary-pressure outlet port 14 through the valve passage 15, so that the secondary pressure P2 rises.

Due to the above described opening and closing operations of the opening/closing valve 16, the secondary pressure P2 produced by reducing the primary pressure P1 can be utilized from the secondary-pressure outlet port 14. The magnitude (set pressure P) of the secondary pressure P2 can be adjusted by adjusting the biasing force of the compression spring 35 that is exerted on the diaphragm body 24 by turning the pressure adjusting screw 37.

In the secondary pressure maintaining operation, the piston portion 22a of the relief valve casing 22 is guided by the cylinder portion 42 of the valve guide 40 to be slidable thereon reciprocally in the axial direction, and a middle part of the pintle 30 is guided by the pintle hole 41 of the valve guide 40 to be slidable thereon reciprocally in the axial direction with the upper end portion 30a of the pintle 30 being supported by the relief valve 26 that moves with the relief valve casing 22, and accordingly, the opening/closing valve 16 opens and closes the valve passage 15 with a high degree of precision without wobbling.
($P < P2$)

If the secondary pressure P2 further rises beyond the tolerance of the set pressure P, the piston plate 19 further rises against the biasing force of the compression spring 35 though the pintle 30 does not move upward since the valve passage 15 is closed by the opening/closing valve 16, and accordingly, the relief valve casing 22 also further rises in the axial direction while sliding the piston portion 22a thereof on the cylinder portion 42. As a result, the first vent hole 23 of the relief valve casing 22 is opened so that the secondary pressure chamber 32 and the secondary-pressure releasing chamber 43 are communicatively connected to each other, and the lower end opening of the second vent hole 25 is disengaged from the upper end portion 30a of the pintle 30 to open the second vent hole 25 and the third vent hole 27, as shown in FIG. 3. Consequently, the secondary pressure P2 at the secondary pressure chamber 32 is applied to the secondary-pressure releasing chamber 43 via the first vent hole 23, and is further applied into the upper housing 11b via the second vent hole 25 and the third vent hole 27 to escape from the fourth vent hole 28 to the atmosphere. Therefore, upon the secondary pressure P2 rising beyond tolerance of the set pressure P, the first vent hole 23 and the second vent hole 25 are opened to release the secondary pressure P2 to the atmosphere, which curbs the rise of the secondary pressure P2 at the secondary pressure outlet port 14.

If the secondary pressure P2 drops, the relief valve casing 22 moves downward. Upon the secondary pressure P2 dropping within tolerance of the set pressure P, the second vent hole 25 is closed by the pintle 30 with the upper end portion 30a being pressed against the conical surface 26b of the relief valve 26, and the first vent hole 23 of the relief valve casing 22 is closed by cylinder portion 42, so that the secondary pressure chamber 32 is shut off from the atmosphere. Accordingly, the secondary pressure P2, which has risen beyond the tolerance of the set pressure P, drops to within tolerance of the set pressure P.

As described above, according to the above illustrated embodiment of the pressure reducing valve 10, the relief valve casing 22 ascends and descends linearly along the axis Z of cylinder portion 42 since the piston portion 22a of the relief valve casing 22 is guided by the cylinder portion 42 of the valve guide 40 to be slidable thereon reciprocally in the axial direction, and the pintle 30 ascends and descends linearly along the axis Z thereof since the pintle 30 is guided by the pintle hole 41 of the valve guide 40 to be slidable thereon reciprocally along the axial direction. In this manner, the relief valve casing 22 and the opening/closing valve 16 are guided linearly by the common valve guide 40 to be slidable along the axis Z of the common valve guide 40, and accordingly, the degree of misalignment and wobbling of the axes of the relief valve casing 22 and the opening/closing valve 16 is minimal, so that the valve opening/closing performance can be maintained over a long period of time.

Additionally, according to the above described embodiment of the pressure reducing valve, since the valve guide 40 is made of resin while the relief valve casing 22 and the pintle 30 are made of metal, both static frictional resistance and sliding frictional resistance between the metal and resin materials become small when the relief valve casing 22 and the pintle 30 slide on the valve guide 40, so that smooth movements are achieved without requiring lubricant.

In addition, according to the above described embodiment of the pressure reducing valve, since lubricant such as grease does not have to be applied to a portion which is in contact with vapor, there is no possibility of lubricant being scattered, so that the pressure reducing valve can be used with no need to provide any special device for preventing lubricant from being scattered even in an environment such as a clean room which does not tolerate scattering of lubricant.

Although the relief valve 26 is formed as a separate member from the relief valve casing 22 in the above illustrated embodiment of the pressure reducing valve, the relief valve 26 can be formed integrally with the relief valve casing 22. When the relief valve 26 is formed as a separate member from the relief valve casing 22, the relief valve 26 can be made of a resin similar to that of the valve guide 40.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A pressure reducing valve comprising:
    a opening/closing valve which opens and closes a passage between a primary pressure chamber and a secondary pressure chamber;
    a diaphragm body which is displaced in accordance with fluctuations in pressure in said secondary pressure chamber;
    a valve hole through which said secondary pressure chamber is communicatively connected with the atmosphere;
    a relief valve which opens and closes said valve hole;
    a relief valve casing installed in a central part of said diaphragm body, said valve hole being formed in an upper part of said relief valve casing;
    a linkage member which links said opening/closing valve and said relief valve with each other so that said opening/closing valve and said relief valve perform valve opening/closing operations thereof in association with each other, wherein said linkage member includes
        a valve guide which includes a valve passage through which said primary pressure chamber and said secondary pressure chamber are communicatively connected to each other, and a pintle hole; and
        a pintle which is inserted into said pintle hole of said valve guide through said valve passage and slidably guided by said pintle hole in an axial direction of said pintle,
    wherein said opening/closing valve is provided on a lower end of said pintle,
    wherein said relief valve is positioned at an upper end of said pintle,
    wherein said valve hole has a common axis with the axes of said valve passage and said pintle hole,
    wherein said relief valve casing includes a piston portion supported by a cylinder portion of said valve guide to be slidable thereon,
    wherein a displacement of said diaphragm body causes said piston portion to move while sliding on said cylinder portion, and
    wherein said valve guide is made of resin and said pintle and said relief valve casing are made of metal.

2. The pressure reducing valve according to claim 1, wherein said relief valve is provided in said relief valve casing,
    wherein said valve hole is formed in said relief valve,
    wherein a substantially conical surface, with which an upper end of said pintle comes in contact, is formed at an end of said valve hole, and
    wherein said pintle is continuously biased by a biasing member in a direction to close said opening/closing valve and said relief valve.

3. The pressure reducing valve according to claim 2, wherein said biasing member comprises a compression spring.

4. The pressure reducing valve according to claim 2, further comprising a spring seat positioned on an opposite side of said relief valve casing from said relief valve side,
    wherein said spring seat is biased by a second biasing member in a direction to press said diaphragm body against said relief valve against said biasing force of said biasing member.

5. The pressure reducing valve according to claim 4, wherein said second biasing member comprises a compression spring.

6. The pressure reducing valve according to claim 1, wherein a space between said cylinder portion of said valve guide and said piston portion of said relief valve casing defines a secondary-pressure releasing chamber, wherein a vent hole is formed through said piston portion of said relief valve casing;

wherein said valve hole is closed when a secondary pressure in said secondary pressure chamber is smaller than a set pressure, and wherein, when said diaphragm body is displaced by a rise of said relief valve casing which is caused by an increase in said secondary pressure in said secondary pressure chamber beyond said set pressure, said vent hole is exposed from said cylinder portion of said valve guide so that said secondary pressure chamber and said secondary-pressure releasing chamber are communicatively connected with each other through said vent hole.

7. The pressure reducing valve according to claim 1, wherein said valve hole, said valve passage, said pintle hole and said pintle are coaxially arranged.

* * * * *